United States Patent
Bhagavatula et al.

(10) Patent No.: US 10,580,330 B2
(45) Date of Patent: Mar. 3, 2020

(54) DEVICE FOR DISPLAYING A BACKLIT IMAGE

(71) Applicant: CORNING INCORPORATED, Corning, NY (US)

(72) Inventors: Venkata Adiseshaiah Bhagavatula, Big Flats, NY (US); Nagaraja Shashidhar, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 203 days.

(21) Appl. No.: 15/328,245

(22) PCT Filed: Jul. 21, 2015

(86) PCT No.: PCT/US2015/041276
§ 371 (c)(1),
(2) Date: Jan. 23, 2017

(87) PCT Pub. No.: WO2016/014487
PCT Pub. Date: Jan. 28, 2016

(65) Prior Publication Data
US 2017/0221393 A1    Aug. 3, 2017

Related U.S. Application Data

(60) Provisional application No. 62/029,108, filed on Jul. 25, 2014, provisional application No. 62/027,335, filed on Jul. 22, 2014.

(51) Int. Cl.
G09F 13/04    (2006.01)
G09F 13/18    (2006.01)
(Continued)

(52) U.S. Cl.
CPC ............ *G09F 13/0409* (2013.01); *B32B 7/12* (2013.01); *B32B 17/06* (2013.01); *G09F 13/04* (2013.01);
(Continued)

(58) Field of Classification Search
CPC ................. G09F 13/0409; G09F 13/18; G09F 2013/049; G09F 2013/1804; G09F 13/04
See application file for complete search history.

(56) References Cited

U.S. PATENT DOCUMENTS 7,281,834 B2    10/2007    Sinofsky
8,608,334 B2    12/2013    Sanders
(Continued)

FOREIGN PATENT DOCUMENTS

CN    201039871 Y    3/2008
CN    201119656 Y    9/2008
(Continued)

OTHER PUBLICATIONS

Patent Cooperation Treaty International Notification of Transmittal of the International Search Report and the Written Opinion of the International Searching Authority, international application No. PCT/US2015/041276: dated Oct. 30, 2015, 16 pages.

*Primary Examiner* — Gary C Hoge
(74) *Attorney, Agent, or Firm* — Payal A. Patel

(57) ABSTRACT

Disclosed herein are frameless display devices comprising a glass sheet (110) having a first surface, an opposing second surface, and a thickness between the first and second surfaces of less than 3 mm; a transparent adhesive layer (120); and an assembly comprising a backlight unit and a back panel (160); wherein at least one of the first and second surfaces is patterned with an image; and wherein the transparent adhesive layer (120) affixes the first surface of the glass sheet (110) to a surface of the assembly. Also disclosed
(Continued)

herein are display devices comprising a glass sheet (110) having a first surface, an opposing second surface, a thickness between the first and second surfaces of less than about 3 mm, and a core having a plurality of light extraction features; a transparent adhesive layer (120); and an assembly comprising a back panel (160). Further disclosed herein are kits for making frameless display devices.

20 Claims, 3 Drawing Sheets

(51) Int. Cl.
    *B32B 7/12* (2006.01)
    *B32B 17/06* (2006.01)

(52) U.S. Cl.
    CPC ........ *G09F 13/18* (2013.01); *B32B 2307/412* (2013.01); *B32B 2309/105* (2013.01); *G09F 2013/049* (2013.01); *G09F 2013/1804* (2013.01); *G09F 2013/189* (2013.01)

(56) References Cited

U.S. PATENT DOCUMENTS

| | | | |
|---|---|---|---|
| 8,786,800 B2 | 7/2014 | Yu et al. | |
| 8,836,886 B2 | 9/2014 | Yu et al. | |
| 8,896,782 B2 | 11/2014 | Yu et al. | |
| 8,896,783 B2 | 11/2014 | Yu et al. | |
| 8,947,613 B2 | 2/2015 | Yu et al. | |
| 8,947,614 B2 | 2/2015 | Yu et al. | |
| 8,947,615 B2 | 2/2015 | Yu et al. | |
| 9,030,623 B2 | 5/2015 | Yu et al. | |
| 9,110,321 B2 | 8/2015 | Yu et al. | |
| 2005/0231935 A1* | 10/2005 | Kimmet | G09F 13/08 362/23.18 |
| 2006/0001035 A1* | 1/2006 | Suehiro | H01L 33/38 257/91 |
| 2006/0021268 A1* | 2/2006 | Ochs | G09F 13/04 40/577 |
| 2007/0025098 A1* | 2/2007 | Kim | G02B 6/0043 362/97.3 |
| 2008/0186725 A1* | 8/2008 | Schlager | B60Q 1/0058 362/507 |
| 2009/0000165 A1* | 1/2009 | Mahajan | G09F 13/18 40/457 |
| 2009/0197048 A1 | 8/2009 | Amin et al. | |
| 2009/0251920 A1* | 10/2009 | Kino | B60Q 1/323 362/602 |
| 2010/0186271 A1 | 7/2010 | Zheng | |
| 2012/0051053 A1* | 3/2012 | Cai | G09F 13/0409 362/249.02 |
| 2013/0027629 A1* | 1/2013 | Kiyohara | G02F 1/133308 349/58 |
| 2013/0050992 A1* | 2/2013 | Schneider | F25D 23/028 362/100 |
| 2013/0120689 A1* | 5/2013 | Iiyama | G02F 1/133606 349/64 |
| 2014/0071653 A1* | 3/2014 | Thompson | G02B 6/005 362/19 |
| 2014/0102144 A1* | 4/2014 | Yamanaka | C03C 21/006 65/30.14 |
| 2015/0225285 A1* | 8/2015 | Domey | C03C 17/34 428/201 |
| 2015/0277023 A1* | 10/2015 | Etienne | G02B 6/0025 362/613 |
| 2016/0234943 A1* | 8/2016 | Chung | H01B 1/22 |
| 2016/0313494 A1* | 10/2016 | Hamilton | G02B 6/0068 |
| 2016/0335933 A1* | 11/2016 | Claire | A01K 63/006 |
| 2017/0003512 A1* | 1/2017 | Shin | G02B 27/2214 |
| 2017/0017107 A1* | 1/2017 | Schwager | G02F 1/133308 |

FOREIGN PATENT DOCUMENTS

| | | |
|---|---|---|
| CN | 201143071 Y | 11/2008 |
| CN | 101856186 A | 10/2010 |
| CN | 201782404 U | 4/2011 |
| CN | 202884665 U | 4/2013 |
| DE | 202004017737 U1 | 4/2005 |
| EP | 2436527 A2 | 4/2012 |
| EP | 2709088 | 3/2014 |
| JP | 11240300 A | 9/1999 |
| KR | 211415 B1 | 12/2012 |
| WO | 2014058748 | 4/2014 |

\* cited by examiner

DEVICE FOR DISPLAYING A BACKLIT IMAGE

CROSS-REFERENCE TO RELATED APPLICATIONS

This application claims the benefit of priority under 35 U.S.C. § 365 of International Patent Application Ser. No. PCT/US15/41276 filed on Jul. 21, 2015, which also claims the benefit of priority under 35 U.S.C. § 119 of U.S. Provisional Application Ser. No. 62/027,335 filed on Jul. 22, 2014 and U.S. Provisional Application Ser. No. 62/029,108 filed on Jul. 25, 2014 the content of which is relied upon and incorporated herein by reference in its entirety.

FIELD OF THE DISCLOSURE

The disclosure relates generally to devices for displaying a backlit image, and more particularly to frameless display devices and kits for making the same.

BACKGROUND

Displays are often illuminated to enhance their visual appearance to the observer. For instance, signs, photographs, graphical images, and paintings may be illuminated, especially in low light conditions. These displays may be front lit, with a light source located in front of the image, or backlit, with a light source located behind the image. Backlighting of images can provide a visually pleasing display; however, at present, such displays are expensive and require a frame around the image. The frame can serve to hold the image, backlight, and/or other components. However, the frame, while providing the interchangeability of the image, can also limit the décor. For instance, a wood frame may fit in one décor motif but not in another. Further, image framing can prevent daisy chaining of images, e.g., forming a seamless collage of smaller images to create a larger image. Finally, overall consumer demand for thinner, lighter display devices drives the need for thinner materials that still maintain sufficient rigidity for the desired application.

Accordingly, it would be advantageous to provide a thinner backlit display device with lower cost and/or higher strength, a backlit display device that does not require a frame, and/or a backlit display device that can be daisy chained to create larger images.

SUMMARY

The disclosure relates, in various embodiments, to frameless display devices comprising a glass sheet having a first surface, an opposing second surface, and a thickness between the first and second surfaces of less than about 3 mm; a transparent adhesive layer; and an assembly comprising a backlight unit and a back panel; wherein at least one of the first and second surfaces of the glass sheet is patterned with an image; and wherein the transparent adhesive layer affixes the first surface of the glass sheet to a surface of the assembly.

In certain embodiments, the glass sheet may have a thickness ranging from about 0.1 mm to less than about 3 mm. According to various embodiments, the glass sheet may be strengthened, e.g., chemically strengthened. The backlight unit may, for example, comprise a light source and a light guide or a light diffusing element. The display device may comprise additional components, such as a diffuser, reflector, heat dissipating layer, brightness enhancing layer, and combinations thereof. The display device may also include a power source, electrical wires, and/or optical cables. The overall thickness of the display device may be less than about 5 mm.

The disclosure also relates to display devices comprising a glass sheet having a first surface, an opposing second surface, and a thickness between the first and second surfaces of less than about 3 mm; a transparent adhesive layer; and an assembly comprising a back panel; wherein at least one of the first and second surfaces of the glass sheet is patterned with an image; wherein the glass sheet comprises a core having a plurality of light extraction features; and wherein the transparent adhesive layer affixes the first surface of the glass sheet to a surface of the assembly.

The disclosure further relates to kits for making frameless display devices, the kit comprising a glass sheet having a first surface, an opposing second surface, and a thickness between the first and second surfaces of less than about 3 mm, and an assembly comprising a transparent adhesive layer, a backlight unit, and a back panel. According to various embodiments, the first and/or second surface of the glass sheet may be patterned with an image and subsequently affixed to the assembly by way of the transparent adhesive layer.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

BRIEF DESCRIPTION OF THE DRAWINGS

The following detailed description can be further understood when read in conjunction with the following drawings.

DETAILED DESCRIPTION

Devices

Figure 1A:
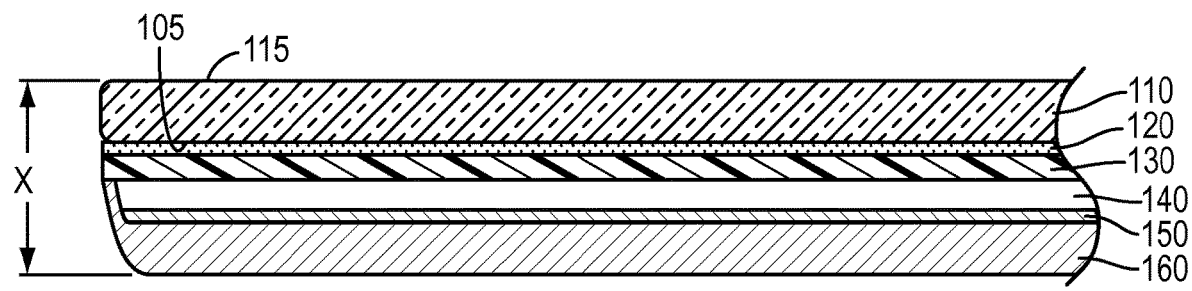
FIG. 1A illustrates a frameless display device configuration according to one aspect of the present disclosure.

Disclosed herein are frameless display devices comprising a glass sheet having a first surface, an opposing second surface, and a thickness between the first and second surfaces of less than about 3 mm; a transparent adhesive layer; and an assembly comprising a backlight unit and a back panel; wherein at least one of the first and second surfaces of the glass sheet is patterned with an image; and wherein the transparent adhesive layer affixes the first surface of the glass sheet to a surface of the assembly.

As used herein, the term "frameless," in some embodiments, can denote that the device does not comprise a separate housing, e.g., a frame, which contains one or more components of the display device, such as the glass or back panel. A conventional frame can contain, e.g., various components of a display, such as the glass, the picture/image, and/or the back panel by wrapping around the components in a manner that blocks at least a portion of the image from view. In such cases, when the device is observed from a plan view a discontinuous border around the image is within view of an observer. A frame can thus be considered to be any component around the image which blocks a portion of the image from view, i.e., in the case of daisy chaining, the individual image frames would form lines or seams that would break up the larger image and conceal at least a part of the overall image. It is to be understood that the frameless devices disclosed herein can, in some embodiments, comprise a protective component for the edge of the glass, but this component does not obstruct the plan view of any portion of the image patterned on the first and/or second surface of the glass sheet. For instance, the device may comprise a relatively thin component, e.g., less than 2 mm, that covers only the edge of the glass sheet, or in various embodiments, the back panel may extend to cover the edge of the glass sheet.

Also disclosed herein are display devices comprising a glass sheet having a first surface, an opposing second surface, and a thickness between the first and second surfaces of less than about 3 mm; a transparent adhesive layer; and an assembly comprising a back panel; wherein at least one of the first and second surfaces is patterned with an image; wherein the glass sheet comprises a core having a plurality of light extraction features; and wherein the transparent adhesive layer affixes the first surface of the glass sheet to a surface of the assembly.

The glass sheet may comprise any glass known in the art that can be printed or patterned with an image including, but not limited to, aluminosilicate, alkali-aluminosilicate, borosilicate, alkali-borosilicate, aluminoborosilicate, alkali-aluminoborosilicate, and other suitable glasses. In certain embodiments, the glass sheet may have a thickness of less than or equal to about 3 mm, for example, less than about 2 mm, or less than about 1 mm, or ranging from about 0.1 mm to about 2.5 mm, from about 0.3 mm to about 2 mm, from about 0.5 mm to about 1.5 mm, or from about 0.7 mm to about 1 mm, including all ranges and subranges therebetween. Non-limiting examples of commercially available glasses suitable for use as a glass light guide and/or as an exemplary glass sheet include, for instance, EAGLE XG®, Lotus™. Willow®, and Gorilla® glasses from Corning Incorporated.

The glass may also be strengthened, e.g., chemically strengthened by ion exchange. During the ion exchange process, ions within a glass sheet at or near the surface of the glass sheet may be exchanged for larger metal ions, for example, from a salt bath. The incorporation of the larger ions into the glass can strengthen the sheet by creating a compressive stress in a near surface region. A corresponding tensile stress can be induced within a central region of the glass sheet to balance the compressive stress.

Ion exchange may be carried out, for example, by immersing the glass in a molten salt bath for a predetermined period of time. Exemplary salt baths include, but are not limited to, $KNO_3$, $LiNO_3$, $NaNO_3$, $RbNO_3$, and combinations thereof. The temperature of the molten salt bath and treatment time period can vary. It is within the ability of one skilled in the art to determine the time and temperature according to the desired application. By way of a non-limiting example, the temperature of the molten salt bath may range from about 400° C. to about 800° C., such as from about 400° C. to about 500° C., and the predetermined time period may range from about 1 to about 24 hours, such as from about 4 hours to about 10 hours, although other temperature and time combinations are envisioned. By way of a non-limiting example, the glass can be submerged in a $KNO_3$ bath, for example, at about 450° C. for about 6 hours to obtain a K-enriched layer which imparts a surface compressive stress and a predetermined depth of layer (DOL) of compressive stress.

According to various embodiments, the glass sheet may have a compressive stress greater than about 100 MPa and a DOL greater than about 10 microns. In other embodiments, the glass sheet may have a compressive stress greater than about 500 MPa and a DOL greater than about 20 microns. According to further embodiments, the glass sheet may have a compressive stress greater than about 600 MPa and a DOL greater than about 25 microns. In still further embodiments, the glass sheet may have a compressive stress greater than about 700 MPa and a DOL greater than about 35 microns.

The glass sheet may, in certain embodiments, be strengthened by applying one or more layers to the first and/or second surfaces of the glass sheet. For example, a layer approximately 10-100 microns thick can be applied to the glass surface(s), this layer comprising a material different from the glass sheet and having a coefficient of thermal expansion (CTE) higher than that of the glass sheet. The layer can then be in a state of compression due to its higher CTE as compared to the center of the glass.

The glass sheet may comprise a first surface and an opposing second surface. The surfaces may, in certain embodiments, be planar or substantially planar, e.g., substantially flat and/or level, or in other embodiments may be curved about a single radius or curved about plural radii (e.g., a complex curvature). The first and second surfaces may, in various embodiments, be parallel or substantially parallel. By way of a non-limiting example, the glass sheet may have a rectangular or square shape having four edges, although other shapes and configurations are envisioned and are intended to fall within the scope of the disclosure.

According to various embodiments, the first surface and optionally the second surface of the glass sheet may be patterned or decorated with an image. As used herein, the term "patterned" is intended to denote that an image is printed or otherwise placed on a surface of the glass sheet in any given pattern or design, and in any number of colors. For instance, the image may be printed on a glass sheet surface using dye-sublimation, inkjet printing, laserjet printing, screen printing, digital scanning, photoprocessing, photograph printing, 3D printing, or using any other device or method capable of creating an image on a glass surface.

According to various embodiments, the first surface and optionally the second surface may be coated with a layer of a lenticular sheet. When a suitable image is printed on either one or both surfaces, a 3D, quasi-3D image, or otherwise "stereoscopic image" can be obtained. The lenticular sheet may have a geometric pattern embossed on the surface, or it can be functionally lenticular, where the functionality is obtained by optical gratings based on diffraction or holography. For example, in some embodiments a lenticular sheet can be laminated to the cover glass where the lenticular sheet is adhered to the glass with a low refractive index adhesive or simply tacked on the edges with air gap between the glass and the lenticular sheet. In other embodiments, a lenticular element can comprise a laminate of a lenticular glass element and a flat sheet. The lenticular glass element can be laminated to the underlying cover glass substrate. In yet further embodiments, the lenticular element may be a flat sheet with the lenticular functionality brought about either with a diffractive and/or a holographic method. The "stereoscopic image" may, in some embodiments, also be obtained by parallax barrier approach.

In certain embodiments, an image may be patterned on the first surface of the glass sheet and the second surface of the glass sheet may be unpatterned. In other embodiments, the first and/or second surface of the glass sheet may have a texture, produced either by etching and/or roughening such that the surface has anti-glare properties. For instance, the first surface of the glass sheet may be patterned with an image and the second surface may be etched, e.g., acid etched, to produce a frosted appearance. According to various embodiments, the second surface may also be patterned with an image. In still further embodiments, both the first and second surfaces may be patterned with an image.

The glass sheet can be affixed to a surface of the assembly by way of a transparent adhesive layer. As used herein, the term "transparent" is intended to denote that the adhesive layer, at a thickness of approximately 1 mm, has a transmission of greater than about 85% in the visible region of the spectrum (400-700 nm). For instance, an exemplary transparent adhesive layer may have greater than about 85% transmittance in the visible light range, such as greater than about 90%, greater than about 95%, or greater than about 99% transmittance, including all ranges and subranges therebetween.

The adhesive layer may comprise any optically transparent material suitable for adhering the glass sheet to the assembly and can be chosen from a wide range of materials depending on the characteristics of the glass sheet and the assembly. The adhesive layer can comprise various materials such as ethylene vinyl acetate (EVA), thermoplastic polyurethane (TPU), polyester (PET), acrylics (e.g., acrylic pressure sensitive adhesive tape), polyvinyl butyral (PVB), ionomers such as SentryGlas® ionomer, pressure sensitive adhesives, or any other suitable, optically clear adhesive material. The transparent adhesive layer may, in various embodiments, have a thickness ranging from about 0.1 mm to about 2 mm, such as from about 0.2 mm to about 1.8 mm, from about 0.3 mm to about 1.5 mm, from about 0.4 mm to about 1.2 mm, or from about 0.5 mm to about 1 mm, including all ranges and subranges therebetween. In non-limiting embodiments, the adhesive layer can comprise light scattering particles dispersed within the layer such that it acts as both an adhesive and a diffuser.

The assembly disclosed herein can comprise, among other components, a backlight unit and a back panel. The backlight unit and back panel may be attached, in certain embodiments by any suitable means, e.g., by adhesives and/or frictional forces. Adhesives such as those disclosed above can be used according to various embodiments, as well as opaque or colored adhesives. Alternatively, the backlight unit and back panel may interlock or otherwise engage each other with suitable frictional forces (e.g., clips, clamps, or the like). In certain embodiments, the backlight unit may fit within or snap into a recess or groove in the back panel. Likewise, if additional components or layers are included in the assembly, these components or layers may be similarly attached by, e.g., adhesives or frictional forces.

The backlight unit may include any component capable of illuminating the image on the glass sheet surface. According to various embodiments, the backlight unit may comprise a light guide and at least one light source optically coupled to the light guide. In other embodiments, the backlight unit may comprise at least one light diffusing element and at least one light source optically coupled to the element. As used herein in the context of a light guide, the term "optically coupled" is intended to denote that the light source is positioned adjacent to an edge or surface of the light guide so as to introduce light into the guide. As used in the context of light diffusing elements, the term "optically coupled" is also intended to denote that the light source and element are connected, e.g., by way of a multi-mode optical fiber or fiber bundle. The light source can also be positioned remotely and coupled to the light diffusing elements using a standard fiber, e.g., at lengths greater than about about 1 to about 10 meters.

The light guide may comprise any suitable material known in the art for use as a light guide, for example, glass and polymeric materials, such as acrylate polymers, e.g., polymethylmethacrylate (PMMA) and the like. The light guide may have any suitable shape, such as a sheet or wedge. In some embodiments, the light guide may be substantially planar, three-dimensional, or may comprise at least one planar surface. As discussed in more detail below, the light guide may comprise one or more bevels or angled edges to increase the total internal reflection (TIR) of the light guide and/or the uniformity of light distribution. According to certain embodiments, the light guide may have a thickness ranging from about 0.1 mm to about 3 mm, such as from about 0.3 mm to about 2.5 mm, from about 0.5 mm to about 2 mm, from about 0.7 mm to about 1.5 mm, or from about 1 mm to about 1.2 mm, including all ranges and subranges therebetween.

The light guide may be equipped with a plurality of light extracting features. When light is injected into the light guide, according to certain embodiments, the light is trapped and bounces within the light guide due to total internal reflection (TIR) until it hits a light extraction feature. The light extraction features may be produced, e.g., by texturizing or etching one or more surfaces of the light guide. Such features may be distributed across one or more surfaces of the light guide, e.g. as textural features making up a roughened surface. According to various embodiments, a surface of the light guide may have a roughness $R_a$ ranging from about 10 nm to about 150 nm, such as from about 50 nm to about 100 nm, including all ranges and subranges therebetween.

In various embodiments, the light extraction features present on the surface(s) of the light guide may comprise light scattering elements and/or light blocking elements. The light extraction features may include, for example, prisms, defects, gaps, channels, notches, screen-printed patterns, and suspended materials, to name a few. For example, the surface(s) of the light guide may be textured, etched, coated, damaged and/or roughened to produce the light extraction features. Non-limiting examples of such methods include, for instance, acid etching the surface, coating the surface with $TiO_2$, and laser damaging the surface. According to various embodiments, the extraction features may be patterned in a suitable density so as to produce a substantially uniform illumination. The light extraction features may produce surface scattering and/or volumetric scattering of light, depending on the depth of the features in the surface. The optical characteristics of these features can be controlled, e.g., by the processing parameters used when producing the extraction features.

The light guide may be treated to create light extraction features according to any method known in the art, e.g., the methods disclosed in co-pending and co-owned International Patent Application No. PCT/US2013/063622, incorporated herein by reference in its entirety. For example, a glass or polymer sheet may be ground and/or polished to achieve the desired thickness and/or surface quality. The sheet may then be optionally cleaned and/or the surface of the sheet to be etched may be subjected to a process for removing contamination, such as exposing the surface to ozone.

According to various embodiments, the glass sheet may serve a dual function both as the surface on which the image is printed and as the light guide. In such embodiments, the glass sheet may comprise a sandwiched glass comprising a core with a higher refractive index which is sandwiched between glass with a lower refractive index on either side. In some embodiments, these sandwiched glasses may also have high compressive stress cladding layers to provide strength to the overall structure. The core of the sandwiched glass can be treated to produce light scattering features. For example, the core can be laser damaged or otherwise treated during the fabrication of the sandwich layer. In these embodiments, the glass sheet may be affixed to an assembly which does not comprise a backlight unit, e.g., the glass sheet may be affixed to a back panel which may or may not comprise additional optional elements, as disclosed below.

Light diffusing elements may include, for example, light diffusing sheets or fibers, which may allow a controlled loss of light from the surface of the element. Light diffusing elements may comprise any suitable material, for instance, glasses, plastics, and acrylics, to name a few. A non-limiting commercial embodiment of such light diffusing elements is the light diffusing fiber Fibrance™ from Corning Incorporated. According to various embodiments, the incorporation of a light diffusing element may decrease the thickness of the display device, as compared to display devices comprising a light guide, although both embodiments can provide display devices with suitable thicknesses. In certain non-limiting embodiments, the light diffusing element may have a thickness ranging from about 0.05 mm to about 5 mm, such as from about 0.1 mm to about 3 mm, from about 0.3 mm to about 2.5 mm, from about 0.5 mm to about 2 mm, from about 0.7 mm to about 1.5 mm, or from about 1 mm to about 1.2 mm, including all ranges and subranges therebetween.

The light source may include, for example, one or more light-emitting diodes (LEDs), cold cathode fluorescent lamps (CCFLs), chemiluminescent light sources, electroluminescent light sources, and the like. A power source may be included to provide electrical power to the light source. For example, the light source may be plugged into an outlet via electrical wires or optical cables extending from the display device. The power source may also comprise, in various embodiments, a battery, solar power cell, or the like. A control panel may also be included in the display device, which can serve to turn the light source on and off. In other embodiments, the device may be provided with a dimmer switch that can increase or decrease the intensity of the light source.

The light source may, in some embodiments, be located at an edge of the backlight unit, e.g., adjacent an edge of the light guide. According to various embodiments, more than one light source may be used. For instance, smaller displays may be illuminated with only one light source, whereas larger displays may comprise two or more light sources. In the case of a light guide in the shape of a rectangular or square sheet, one or more light sources may be optically coupled to, e.g., one side, two opposing sides, two adjacent sides, or all four sides. In other embodiments, the light source may be positioned behind the light guide, as discussed in more detail below with respect to FIGS. 2A-B.

According to various embodiments, a light source may be physically located or housed within the display device or may be externally located. For instance, the light source may be physically coupled with the power source. If the display device is powered by a wall plug, the light source, e.g., an LED, may be located within the wall plug. In the case of a display device comprising a light diffusing element, the light from the wall plug may be transmitted by a multi-mode optical fiber or fiber bundle and coupled to the light diffusing element. The number and position of the light sources may vary according to the display size and shape and desired illumination effect and all variations thereon are intended to fall within the scope of the disclosure.

The back panel of the assembly may comprise a wide range of materials and/or a wide range of thicknesses or configurations. For example, the back panel of the assembly may comprise metals, such as steel, cold rolled steel, aluminum or any other suitable metal, or plastics, such as molded plastic elements of various shapes and sizes. In some embodiments, the back panel may be injection molded onto an exemplary glass sheet and/or light guide. According to other embodiments, a combination of plastics and metals can be used in the back panel. The back panel may also comprise one or more features for mounting the display device, e.g., on a rigid or non-rigid surface, such as a wall or exhibit display. These features may for example, be molded to the back panel itself, or can be affixed by adhesives or physical fasteners, such as clips or screws. In still further embodiments, the back panel can extend around the perimeter of the glass sheet to protect the glass edges.

The back panel can, in various embodiments, provide support to the display device. In the case of a plastic back panel, the stiffness of the back panel may be enhanced, e.g., by molding a pattern into the back of the cover according to methods known in the plastics industry. Alternatively or additionally a metal frame can be insert-molded into a plastic back panel or can be snapped inside slots provided in the back panel. Various methods for stiffening or reinforcing plastic panels are known and envisioned to fall within the scope of the disclosure.

The back panel may, in certain embodiments, have a thickness ranging from about 0.5 mm to about 2 mm, such as from about 1 mm to about 1.5 mm, including all ranges and subranges therebetween. The total thickness of the display device may therefore be less than about 5 mm, such as less than about 4 mm, or less than about 3 mm. For instance, the display device may have a thickness ranging from about 2 mm to about 5 mm, such as from about 2.5 mm to about 4.5 mm, or from about 3 mm to about 4 mm, including all ranges and subranges therebetween According to various embodiments, the assembly may further include a reflecting layer and/or a diffusing layer on either side of the backlight unit, e.g., on either side of the light guide or light diffusing element. The reflector can send recycled light back through the backlight unit and may reflect, e.g., up to about 85% of the light and randomize its angular and polarization properties. A diffuser may be used to improve the spatial uniformity of the light. In various embodiments, the assembly may include a light guide and/or light diffusing element having a reflector on one side and a diffuser on the opposing side.

The display device may further include extra components or layers known in the art. For example, a brightness enhancing film may be included in the display device. Such films can direct light towards the viewer, enhancing the efficiency of the light source. The display device can also include a heat dissipation layer, such as a metal film, to dissipate heat from the light source and/or power source and maintain a cooler overall temperature for the device. Other layers and substrates may be provided, e.g., covers and/or interfaces between the various components, such as a transparent plexiglass plate, which may be placed over the glass sheet or between the glass sheet and the assembly, or in any other desired configuration.

According to certain embodiments, the display devices may be configured so as to allow the formation of a daisy chain, e.g., a seamless connection of one or more display devices in one or more directions. For example, one or more display devices may be connected horizontally or vertically, or both horizontally and vertically, to create a larger, relatively seamless image. The display device may have two or more electrical connectors on one or more edges. These connectors may be used to connect the display device to a power supply or to one or more additional display devices. For instance, in the case of a rectangular or square display device, an electrical connector may be located on each of the four edges, e.g., positioned approximately at the center of each edge. These connectors can then be used to daisy chain additional display devices, for instance, in a two-dimensional pattern, both vertically and horizontally, to create a larger image. Other configurations are possible and may vary depending on the shape and other attributes of the display device and are intended to fall within the scope of the disclosure.

Various embodiments will now be described in the context of the provided figures, but are not intended to be limiting to the disclosure or the appended claims. FIG. 1A illustrates an exemplary display device according to various embodiments of the disclosure. The device comprises a glass sheet 110 having a first surface 105 and second surface 115. An image (not shown) may be printed on the first and/or second surface of the glass sheet 110. An adhesive layer 120 can be affixed to the first surface 105. The adhesive layer 120 can attach the glass sheet 110 to a surface of an assembly comprising, in this embodiment, a diffuser 130, a backlight unit comprising a light guide 140 and a light source (not shown), a reflector 150, and a back panel 160. In the illustrated embodiment, the adhesive layer 120 affixes the first surface 105 of the glass sheet 110 to the diffuser 130, but it is envisioned that the glass sheet can be affixed to any surface or layer of the assembly, e.g., an intermediate substrate or other film (not shown). The display device has a thickness x, which may range, for example, from about 2 mm to about 5 mm, such as from about 3 mm to about 4 mm.

Figure 1B:
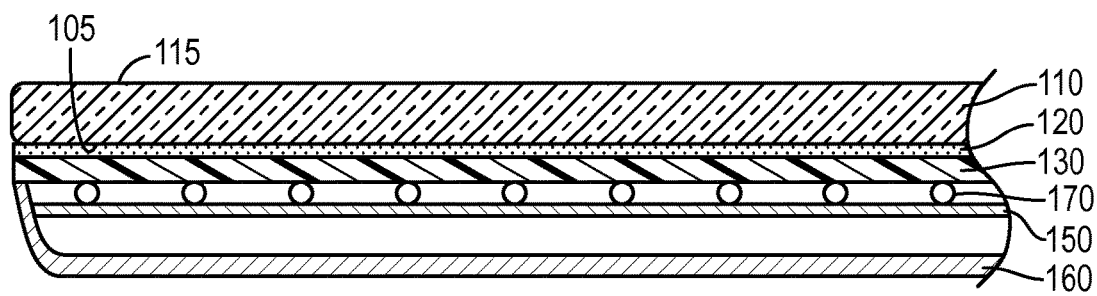
FIG. 1B illustrates a frameless display device configuration according to another aspect of the present disclosure.

FIG. 1B illustrates another exemplary display device according to other embodiments of the disclosure. The device comprises a glass sheet 110 having a first surface 105 and second surface 115. An adhesive layer 120 can be affixed to the first surface 105. The adhesive layer 120 can attach the glass sheet 110 to a surface of an assembly comprising, in this embodiment, a diffuser 130, a backlight unit comprising a light diffusing element 170 and a light source (not shown), a reflector 150, and a back panel 160.

Figure 2A:
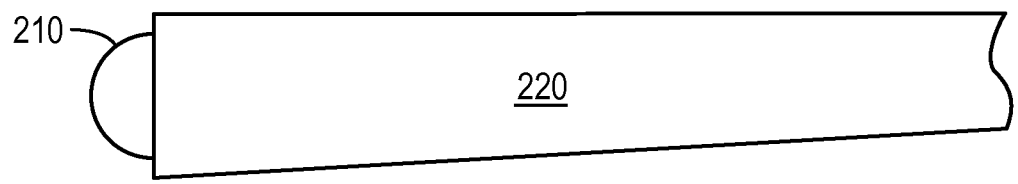
FIG. 2A is a simplified depiction of a backlight configuration according to one aspect of the present disclosure.
Figure 2B:
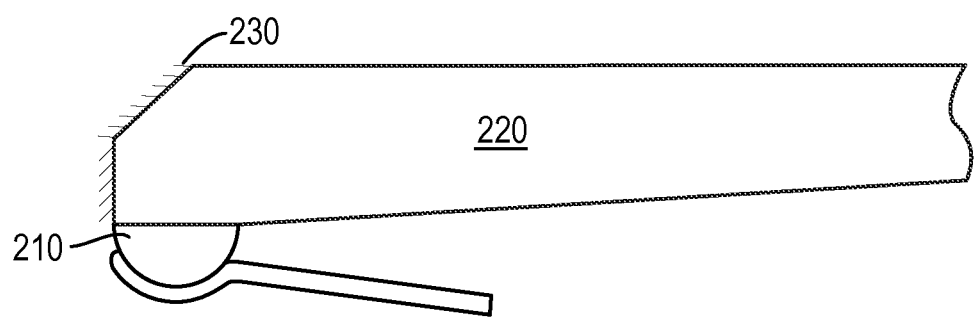
FIG. 2B is a simplified depiction of a backlight configuration according to another aspect of the present disclosure.

As previously noted, the backlight unit can have various configurations including various components (e.g., light guide or light diffusing element) and their positions relative to each other (e.g., light source placement). FIGS. 2A-B demonstrate two such non-limiting configurations. In FIG. 2A, a simplified backlight configuration is depicted in which a light source 210 is optically coupled to the edge of a light guide 220. Although the light guide in this embodiment is depicted as having a wedge shape (which may, in some embodiments, improve the uniformity of light distribution), it is to be understood that any suitable light guide shape may be used. FIG. 2B demonstrates another simplified configuration in which the light source 210 is rear-mounted to the back of the light guide 220. In this instance, the light guide 220 may be modified to include a bevel 230, which may, in various non-limiting embodiments, have an acute angle as measured from a horizontal plane of the wedge, for example, approximately 45°. The bevel 230 can redirect light from the light source 210 at the back of the light guide to and along the length of the light guide 220. The bevel 230 can optionally be provided with a reflective coating to enhance the redirection of the light.

Figure 3:
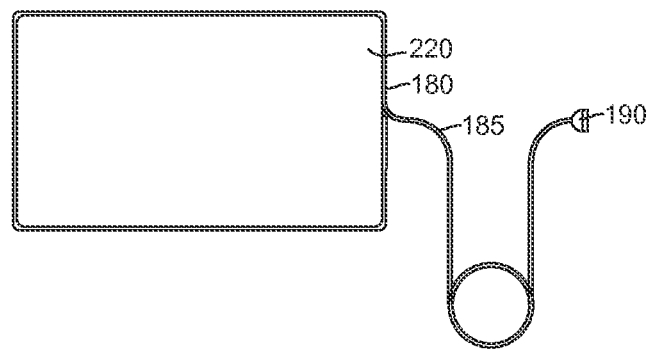
FIG. 3 is a simplified depiction of another backlight configuration according to an aspect of the present disclosure.

FIG. 3 is a simplified depiction of another backlight configuration according to an aspect of the present disclosure. With reference to FIG. 3, an exemplary light diffusing element 180 may be wrapped along the edge of a light guide 220 and connected to a light transmission element 185. In this non-limiting configuration, the light source 190, and thereby any electrical connections can be kept separate from the device.

Kits

Also disclosed herein are kits for making frameless display devices, the kit comprising a glass sheet having a first surface, an opposing second surface, and a thickness between the first and second surfaces of less than about 3 mm, and an assembly comprising a transparent adhesive layer, a backlight unit, and a back panel. According to various embodiments, the kit may further comprise a power source and/or electrical wires and/or optical cables for the display device. The first and/or second surface of the glass sheet in such a kit may be preprinted or may be patterned with an image upon receipt. The assembly included in such a kit may comprise an adhesive layer affixed to a surface of the assembly. The opposing side of the adhesive layer may be covered, e.g., by a paper or plastic backing. The user may then attach the glass sheet to the assembly by removing the cover on the adhesive layer and affixing the glass sheet to the assembly by, e.g., applying pressure. The device thus produced can display a backlit image. It will be understood that all aspects disclosed above with respect to the display device can be incorporated into the various aspects of the kits herein described.

It will also be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is to be understood that, as used herein the terms "the," "a," or "an," mean "at least one," and should not be limited to "only one" unless explicitly indicated to the contrary. Thus, for example, reference to "a light source" includes examples having two or more such light sources unless the context clearly indicates otherwise. Likewise, a "plurality" is intended to denote "more than one." As such, a "plurality of light extraction features" includes two or more such features, such as three or more such features, etc.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a device that comprises A+B+C include embodiments where a device consists of A+B+C and embodiments where a device consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A frameless display device comprising:
   (a) a glass sheet comprising a first surface, an opposing second surface, and a thickness between the first and second surfaces of less than about 3 mm;
   (b) a transparent adhesive layer; and
   (c) an assembly comprising:
      a backlight unit; and
      a back panel,
   wherein at least one of the first and second surfaces of the glass sheet is patterned with an image,
   wherein the transparent adhesive layer affixes the first surface of the glass sheet to a surface of the assembly; and
   wherein the display device does not comprise a housing containing one or more of components (a)-(c) of the display device.

2. The frameless display device of claim 1, wherein the glass sheet comprises a glass chosen from aluminosilicate, alkali-aluminosilicate, borosilicate, alkali-borosilicate, aluminoborosilicate, and alkali-aluminoborosilicate glasses.

3. The frameless display device of claim 1, wherein the glass sheet has a thickness ranging from about 0.1 mm to about 2.5 mm.

4. The frameless display device of claim 1, wherein the glass sheet is chemically strengthened.

5. The frameless display device of claim 1, wherein the glass sheet has a compressive stress greater than about 100 MPa and a depth of layer of compressive stress greater than about 10 microns.

6. The frameless display device of claim 1, wherein at least one of the first and second surfaces of the glass sheet is an anti-glare surface.

7. The frameless display device of claim 1, wherein at least one of the first and second surfaces of the glass sheet is patterned with a stereoscopic image.

8. The frameless display device of claim 1, wherein the transparent adhesive layer is chosen from ethylene vinyl acetate, thermoplastic polyurethane, polyester, acrylic polymers, polyvinyl butyral, and ionomers.

9. The frameless display device of claim 1, wherein the transparent adhesive layer has a thickness ranging from about 0.1 mm to about 2 mm.

10. The frameless display device of claim 1, wherein the backlight unit comprises a light guide and a light source.

11. The frameless display device of claim 10, wherein the light guide comprises a plurality of light extraction features produced by etching, roughening, coating, or damaging at least one surface of the light guide.

12. The frameless display device of claim 10, wherein the light source is optically coupled to the light guide and wherein the light source is physically located separate from the frameless display device.

13. The frameless display device of claim 10, wherein the light source is optically coupled to an edge of the light guide.

14. The frameless display device of claim 10, wherein the light source is positioned between the light guide and the back panel.

15. The frameless display device of claim 1, wherein the backlight unit comprises a light diffusing element and a light source.

16. The frameless display device of claim 15, wherein the light diffusing element is chosen from light diffusing fibers.

17. The frameless display device of claim 16, wherein the light source is optically coupled to the light diffusing fibers by an optical cable.

18. The frameless display device of claim 1, further comprising at least one component chosen from a reflector, diffuser, heat dissipation layer, brightness enhancing layer, power source, electrical wires, optical cables, and combinations thereof.

19. The frameless display device of claim 1, having a thickness of less than about 5 mm.

20. A display device comprising:
   (a) a glass sheet comprising a first surface, an opposing second surface, and a thickness between the first and second surfaces of less than about 3 mm;
   (b) a transparent adhesive layer; and
   (c) an assembly comprising a back panel,
   wherein at least one of the first and second surfaces of the glass sheet is patterned with an image,
   wherein the glass sheet further comprises a core comprising a plurality of light extraction features,
   wherein the transparent adhesive layer affixes the first surface of the glass sheet to a surface of the assembly; and
   wherein the display device does not comprise a housing containing one or more of components (a)-(c) of the display device.

* * * * *